US008548478B2

(12) United States Patent
Ozluturk

(10) Patent No.: US 8,548,478 B2
(45) Date of Patent: Oct. 1, 2013

(54) METHOD AND SYSTEM FOR FACILITATING HANDOVER FROM A THIRD GENERATION (3G) CELLULAR COMMUNICATION SYSTEM TO A WIRELESS LOCAL AREA NETWORK (WLAN)

(75) Inventor: Faith Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/986,717

(22) Filed: Nov. 12, 2004

(65) Prior Publication Data

US 2005/0107085 A1    May 19, 2005

Related U.S. Application Data

(60) Provisional application No. 60/519,761, filed on Nov. 13, 2003.

(51) Int. Cl.
H04W 36/00          (2009.01)

(52) U.S. Cl.
USPC ........... 455/443; 455/436; 455/440; 455/444; 370/331

(58) Field of Classification Search
USPC .................. 455/426.1, 436–444, 517, 67.11, 455/41.2, 561; 370/331, 332, 338
See application file for complete search history.

(56) References Cited

U.S. PATENT DOCUMENTS

| 3,952,610 | A |   | 4/1976  | Hope et al. |
| 5,611,050 | A |   | 3/1997  | Theimer et al. |
| 5,666,650 | A | * | 9/1997  | Turcotte et al. ............... 370/329 |
| 5,787,347 | A |   | 7/1998  | Yu et al. |
| 5,826,188 | A |   | 10/1998 | Tayloe et al. |
| 5,862,480 | A |   | 1/1999  | Wild et al. |
| 5,930,700 | A |   | 7/1999  | Pepper et al. |
| 5,946,634 | A |   | 8/1999  | Korpela |
| 5,999,816 | A |   | 12/1999 | Tiedemann et al. |

(Continued)

FOREIGN PATENT DOCUMENTS

| EP | 0 852 448 | 7/1998 |
| EP | 0852448   | 7/1998 |

(Continued)

OTHER PUBLICATIONS

Zhang et al., "Integration of Wireless LAN and 3G Wireless—Efficianet Mobility Management for Vertical Handoff between WWAN and WLAN,".

(Continued)

Primary Examiner — Marcos Torres
(74) Attorney, Agent, or Firm — Volpe and Koenig, P.C.

(57) ABSTRACT

A method for facilitating inter-system handover by a multi-mode wireless transmit/receive unit (WTRU) is disclosed. The WTRU is capable of communicating in multiple wireless communication systems using different wireless communication protocols. A first wireless communication system provides a hot spot within the coverage area of a second wireless communication system. A base station in a cell in the second wireless communication system generates and transmits a message to inform the WTRU of the existence of the hot spot located in the vicinity of the cell. The WTRU receives the message and is therefore informed of the existence of the hot spot in the vicinity of the cell.

20 Claims, 2 Drawing Sheets

(56) References Cited

U.S. PATENT DOCUMENTS

| | | | |
|---|---|---|---|
| 6,057,782 A | 5/2000 | Koenig | |
| 6,061,565 A | 5/2000 | Innes et al. | |
| 6,112,093 A | 8/2000 | Nordlund | |
| 6,115,608 A | 9/2000 | Duran et al. | |
| 6,128,490 A | 10/2000 | Shaheen et al. | |
| 6,201,968 B1 | 3/2001 | Ostroff et al. | |
| 6,243,581 B1 | 6/2001 | Jawanda | |
| 6,304,755 B1* | 10/2001 | Tiedemann et al. | 455/437 |
| 6,353,602 B1 | 3/2002 | Cheng et al. | |
| 6,385,772 B1 | 5/2002 | Courtney | |
| 6,400,265 B1 | 6/2002 | Saylor et al. | |
| 6,400,951 B1 | 6/2002 | Vaara | |
| 6,470,184 B1 | 10/2002 | Machida | |
| 6,487,410 B1 | 11/2002 | Kontio et al. | |
| 6,546,246 B1 | 4/2003 | Bridges et al. | |
| 6,591,103 B1 | 7/2003 | Dunn et al. | |
| 6,594,242 B1 | 7/2003 | Kransmo | |
| 6,600,758 B1* | 7/2003 | Mazur et al. | 370/508 |
| 6,615,048 B1 | 9/2003 | Hayashi | |
| 6,643,513 B2 | 11/2003 | Timonen et al. | |
| 6,668,175 B1 | 12/2003 | Almgren et al. | |
| 6,680,923 B1 | 1/2004 | Leon | |
| 6,718,178 B1 | 4/2004 | Sladek et al. | |
| 6,721,565 B1 | 4/2004 | Ejzak et al. | |
| 6,735,433 B1 | 5/2004 | Cervantes | |
| 6,747,968 B1 | 6/2004 | Seppala et al. | |
| 6,768,726 B2 | 7/2004 | Dorenbosch et al. | |
| 6,771,964 B1 | 8/2004 | Einola et al. | |
| 6,801,772 B1 | 10/2004 | Townend et al. | |
| 6,801,786 B1 | 10/2004 | Korpela | |
| 6,826,154 B2 | 11/2004 | Subbiah et al. | |
| 6,829,481 B2 | 12/2004 | Souissi | |
| 6,832,093 B1 | 12/2004 | Ranta | |
| 6,845,238 B1 | 1/2005 | Muller | |
| 6,894,988 B1 | 5/2005 | Zehavi | |
| 6,961,561 B2 | 11/2005 | Himmel et al. | |
| 6,963,745 B2 | 11/2005 | Singh et al. | |
| 6,973,309 B1 | 12/2005 | Rygula et al. | |
| 6,983,149 B2 | 1/2006 | Lindquist et al. | |
| 7,006,828 B1 | 2/2006 | Czaja et al. | |
| 7,009,952 B1 | 3/2006 | Razavilar et al. | |
| 7,016,306 B2 | 3/2006 | Alapuranen et al. | |
| 7,016,691 B2 | 3/2006 | Yaguchi et al. | |
| 7,089,008 B1 | 8/2006 | Back et al. | |
| 7,092,710 B1 | 8/2006 | Stoter et al. | |
| 7,092,743 B2 | 8/2006 | Vegh | |
| 7,096,015 B2 | 8/2006 | Bridges et al. | |
| 7,133,384 B2 | 11/2006 | Park et al. | |
| 7,146,636 B2 | 12/2006 | Crosbie | |
| 7,149,521 B2 | 12/2006 | Sundar et al. | |
| 7,155,225 B2 | 12/2006 | Segal et al. | |
| 7,164,923 B2 | 1/2007 | Tsunomoto et al. | |
| 7,181,218 B2 | 2/2007 | Ovesjo et al. | |
| 7,200,401 B1 | 4/2007 | Hulkkonen et al. | |
| 7,206,318 B2 | 4/2007 | Keller | |
| 7,221,929 B2 | 5/2007 | Lee et al. | |
| 7,254,119 B2 | 8/2007 | Jiang et al. | |
| 7,263,367 B1 | 8/2007 | Sabot | |
| 7,283,507 B2 | 10/2007 | Buckley et al. | |
| 7,376,098 B2 | 5/2008 | Loeffler et al. | |
| 7,418,267 B2 | 8/2008 | Karaoguz | |
| 7,486,635 B2 | 2/2009 | Okanoue et al. | |
| 7,508,799 B2 | 3/2009 | Sumner et al. | |
| 7,551,576 B2 | 6/2009 | Ahmavaara | |
| 7,567,806 B2 | 7/2009 | Vare et al. | |
| 7,590,708 B2 | 9/2009 | Hsu | |
| 7,599,379 B2 | 10/2009 | Kelly et al. | |
| 7,610,049 B2 | 10/2009 | Watanabe | |
| 2002/0022478 A1 | 2/2002 | Iwao | |
| 2002/0024937 A1 | 2/2002 | Barnard et al. | |
| 2002/0025810 A1 | 2/2002 | Takayama et al. | |
| 2002/0032034 A1 | 3/2002 | Tiedemann et al. | |
| 2002/0032748 A1 | 3/2002 | Myojo | |
| 2002/0068570 A1 | 6/2002 | Abrol et al. | |
| 2002/0082044 A1* | 6/2002 | Davenport | 455/552 |
| 2002/0120749 A1 | 8/2002 | Widegren et al. | |
| 2002/0136226 A1 | 9/2002 | Christoffel et al. | |
| 2002/0146021 A1 | 10/2002 | Schwartz et al. | |
| 2002/0147008 A1* | 10/2002 | Kallio | 455/426 |
| 2002/0147012 A1 | 10/2002 | Leung et al. | |
| 2002/0180582 A1 | 12/2002 | Nielsen | |
| 2003/0002525 A1 | 1/2003 | Grilli et al. | |
| 2003/0003933 A1* | 1/2003 | Deshpande et al. | 455/510 |
| 2003/0012156 A1 | 1/2003 | Fukuda | |
| 2003/0013443 A1 | 1/2003 | Willars et al. | |
| 2003/0013463 A1 | 1/2003 | Yen | |
| 2003/0045322 A1 | 3/2003 | Baer et al. | |
| 2003/0046546 A1 | 3/2003 | Endo | |
| 2003/0080996 A1 | 5/2003 | Lavin et al. | |
| 2003/0081567 A1* | 5/2003 | Okanoue et al. | 370/338 |
| 2003/0092444 A1 | 5/2003 | Sengodan et al. | |
| 2003/0100307 A1 | 5/2003 | Wolochow et al. | |
| 2003/0114158 A1 | 6/2003 | Soderbacka et al. | |
| 2003/0118015 A1* | 6/2003 | Gunnarsson et al. | 370/389 |
| 2003/0119480 A1 | 6/2003 | Mohammed | |
| 2003/0123479 A1 | 7/2003 | Lee et al. | |
| 2003/0125028 A1 | 7/2003 | Reynolds | |
| 2003/0142641 A1* | 7/2003 | Sumner et al. | 370/328 |
| 2003/0148777 A1 | 8/2003 | Watanabe et al. | |
| 2003/0148786 A1 | 8/2003 | Cooper et al. | |
| 2003/0149875 A1 | 8/2003 | Hosaka | |
| 2003/0163558 A1 | 8/2003 | Cao et al. | |
| 2003/0174667 A1 | 9/2003 | Krishnamurthi et al. | |
| 2003/0179726 A1 | 9/2003 | Forssell et al. | |
| 2003/0206533 A1 | 11/2003 | Charas | |
| 2003/0208602 A1 | 11/2003 | Bhalla et al. | |
| 2003/0218995 A1 | 11/2003 | Kim et al. | |
| 2004/0002343 A1 | 1/2004 | Brauel et al. | |
| 2004/0014474 A1 | 1/2004 | Kanada | |
| 2004/0018829 A1 | 1/2004 | Raman et al. | |
| 2004/0028009 A1 | 2/2004 | Dorenbosch et al. | |
| 2004/0029587 A1 | 2/2004 | Hulkkonen et al. | |
| 2004/0033805 A1 | 2/2004 | Verma et al. | |
| 2004/0058717 A1* | 3/2004 | McDonnell et al. | 455/456.1 |
| 2004/0063426 A1* | 4/2004 | Hunkeler | 455/426.1 |
| 2004/0068571 A1 | 4/2004 | Ahmavaara | |
| 2004/0090937 A1* | 5/2004 | Chaskar et al. | 370/331 |
| 2004/0092259 A1 | 5/2004 | Blanc et al. | |
| 2004/0100913 A1 | 5/2004 | Kalliokulju et al. | |
| 2004/0103204 A1 | 5/2004 | Yegin | |
| 2004/0105434 A1* | 6/2004 | Baw | 370/352 |
| 2004/0114553 A1 | 6/2004 | Jiang et al. | |
| 2004/0127241 A1 | 7/2004 | Shostak | |
| 2004/0152480 A1* | 8/2004 | Willars et al. | 455/513 |
| 2004/0157600 A1 | 8/2004 | Stumpert et al. | |
| 2004/0176103 A1 | 9/2004 | Trossen et al. | |
| 2004/0185845 A1* | 9/2004 | Abhishek et al. | 455/422.1 |
| 2004/0203732 A1 | 10/2004 | Brusilovsky et al. | |
| 2004/0203748 A1 | 10/2004 | Kappes et al. | |
| 2004/0203773 A1 | 10/2004 | Balasubramanian et al. | |
| 2004/0203792 A1 | 10/2004 | Shaheen et al. | |
| 2004/0203873 A1* | 10/2004 | Gray | 455/456.1 |
| 2004/0203890 A1* | 10/2004 | Karaoguz et al. | 455/456.1 |
| 2004/0218605 A1 | 11/2004 | Gustafsson et al. | |
| 2004/0235455 A1 | 11/2004 | Jiang | |
| 2004/0264410 A1 | 12/2004 | Sagi et al. | |
| 2004/0264414 A1 | 12/2004 | Dorenbosch | |
| 2005/0025164 A1 | 2/2005 | Kavanagh et al. | |
| 2005/0047373 A1 | 3/2005 | Kojima | |
| 2005/0059410 A1 | 3/2005 | Trossen et al. | |
| 2005/0064877 A1 | 3/2005 | Gum et al. | |
| 2005/0070367 A1 | 3/2005 | Vestama et al. | |
| 2005/0090259 A1* | 4/2005 | Jain et al. | 455/439 |
| 2005/0107085 A1 | 5/2005 | Ozluturk | |
| 2005/0107093 A1 | 5/2005 | Dowling | |
| 2005/0153725 A1 | 7/2005 | Naghian et al. | |
| 2005/0176445 A1 | 8/2005 | Qu et al. | |
| 2005/0177733 A1 | 8/2005 | Stadelmann et al. | |
| 2005/0181776 A1 | 8/2005 | Verma et al. | |
| 2005/0202791 A1 | 9/2005 | Krause et al. | |
| 2005/0250491 A1 | 11/2005 | Roy | |
| 2005/0288019 A1 | 12/2005 | Park et al. | |
| 2006/0004643 A1 | 1/2006 | Stradelmann et al. | |
| 2006/0052100 A1 | 3/2006 | Almgren | |

| | | | |
|---|---|---|---|
| 2006/0056448 A1 | 3/2006 | Zaki et al. | |
| 2006/0084440 A1 | 4/2006 | Bakri | |
| 2006/0194582 A1 | 8/2006 | Cooper | |
| 2006/0291455 A1 | 12/2006 | Katz et al. | |
| 2006/0293053 A1 | 12/2006 | Zanaty | |
| 2007/0072603 A1 | 3/2007 | Wang | |
| 2007/0093201 A1 | 4/2007 | Hsu et al. | |
| 2007/0112948 A1 | 5/2007 | Uhlik | |
| 2007/0208864 A1 | 9/2007 | Flynn et al. | |
| 2007/0217366 A1* | 9/2007 | Sagi et al. | 370/331 |
| 2007/0259653 A1 | 11/2007 | Tang et al. | |
| 2008/0101291 A1 | 5/2008 | Jiang et al. | |
| 2008/0240036 A1 | 10/2008 | Liu et al. | |

FOREIGN PATENT DOCUMENTS

| | | |
|---|---|---|
| EP | 0 936 777 | 8/1999 |
| EP | 1 081 909 | 3/2001 |
| EP | 1081909 | 3/2001 |
| EP | 1 178 646 | 2/2002 |
| EP | 1178646 | 2/2002 |
| EP | 1 213 941 | 6/2002 |
| EP | 1213941 | 6/2002 |
| EP | 1 253 796 | 10/2002 |
| EP | 1 257 141 | 11/2002 |
| EP | 1257141 | 11/2002 |
| EP | 1 278 143 | 1/2003 |
| EP | 1278143 | 1/2003 |
| EP | 1 395 076 | 3/2004 |
| EP | 1395076 | 3/2004 |
| EP | 1 424 862 | 6/2004 |
| EP | 1 597 868 | 11/2005 |
| EP | 1597868 | 11/2005 |
| GB | 2 322 051 | 8/1998 |
| GB | 2322051 | 8/1998 |
| GB | 2 352 586 | 1/2001 |
| GB | 2 377 130 | 12/2002 |
| GB | 2377130 | 12/2002 |
| GB | 2 390 777 | 1/2004 |
| GB | 2 391 432 * | 2/2004 |
| GB | 2391432 | 2/2004 |
| JP | 10-004580 | 1/1998 |
| JP | 2000-092541 | 3/2000 |
| JP | 2000-270356 | 9/2000 |
| JP | 2001-258058 | 9/2001 |
| JP | 2003-264868 | 9/2003 |
| JP | 2004-320473 | 11/2004 |
| JP | 2004-349976 | 12/2004 |
| JP | 2005-295332 | 10/2005 |
| KR | 2000-0060796 | 10/2000 |
| KR | 2002-0037564 | 5/2002 |
| KR | 2002-0073997 | 9/2002 |
| KR | 2004-0051329 | 6/2004 |
| TW | 243573 | 3/1995 |
| TW | 300943 | 3/1997 |
| WO | 96/36190 | 11/1996 |
| WO | 99/67902 | 12/1999 |
| WO | 00/04718 | 1/2000 |
| WO | 00/60895 | 10/2000 |
| WO | 00/65802 | 11/2000 |
| WO | 01/28154 | 4/2001 |
| WO | 01/31963 | 5/2001 |
| WO | 01/35585 | 5/2001 |
| WO | 01/58177 | 8/2001 |
| WO | 01/69858 | 9/2001 |
| WO | 02/11358 | 2/2002 |
| WO | 02/13157 | 2/2002 |
| WO | 02/30133 | 4/2002 |
| WO | 02/062094 | 8/2002 |
| WO | 02/080605 | 10/2002 |
| WO | 03/003639 | 1/2003 |
| WO | 03/024144 | 3/2003 |
| WO | 03/045095 | 5/2003 |
| WO | 03/054721 | 7/2003 |
| WO | 03/079660 | 9/2003 |
| WO | 2004/006482 | 1/2004 |
| WO | 2004/089021 | 10/2004 |
| WO | 2004/100452 * | 11/2004 |
| WO | 2005/027556 | 3/2005 |
| WO | 2005/051026 | 6/2005 |
| WO | 2006/020168 | 2/2006 |

OTHER PUBLICATIONS

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.18.0 (Sep. 2004).

Zhang et al., "Integration of Wireless LAN and 3G Wireless—Efficianet Mobility Management for Vertical Handoff between WWAN and WLAN," 2003.

Third Generation Partnership Project, "Technical Specification Group Services and System Aspects; Feasibility study on 3GPP system to Wireless Local Area Network (WLAN) internetworking; (Release 6)," 3GPP TR 22.934 V6.2.0 (Sep. 2003).

Third Generation Partnership Project, "Technical Specification Group Services and System Aspects; 3GPP system to Wireless Local Area Network (WLAN) internetworking; System description (Release 6)," 3GPP TS 22.234 V2.2.0 (Sep. 2003).

3GPP TSG CN #9, Hawaii, USA, Sep. 20-22, 2000, Tdoc 3GPP NP-000451.

IEEE P802.21/D01.00, Mar. 2006, Draft IEEE Standard for Local and Metropolitan Area Networks: Media Independent Handover Services.

Jassemuddin, "An Architecture for Integrating UMTS and 802.11 WLAN Networks." Proceedings of the $8^{th}$ IEEE International Symposium on Computers and Communication, 2003, pp. 716-723.

Morand et al., "Global Mobility Approach with Mobile IP in "All IP" Networks," IEEE International Conference on Communications, ICC 2002, vol. 4, pp. 2075-2079, (2002).

Parkvall, "Long-Term 3G Radio Access," Ericsson Research (Nov. 12, 2005).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.13.0 (Sep. 2003).

Third Generation Partnership Project, "Technical Specification Group GSM/EDGE Radio AccessNetwork; General Packet Radio Service (GPRS); Mobile Station (MS)—Base Station System (BSS) interface; Radio Link Control/Medium Access Control (RLC/MAC) protocol (Release 4)," 3GPP TS 44.060 V4.18.0 (Sep. 2004).

Third Generation Partnership Project, "Technical Specification Group GSM/Edge Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.8.0 (Sep. 2003).

Third Generation Partnership Project, "Technical Specification Group GSM/Edge Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.13.0 (Sep. 2004).

Third Generation Partnership Project, "Technical Specification Group GSM/Edge Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.4.0 (Sep. 2003).

Third Generation Partnership Project, "Technical Specification Group GSM/Edge Radio Access Network; General Packet Radio Service (GPRS); Mobile Station (MS)—Base Station System (BSS) interface; Radio Link Control/Medium Access Control (RLC/MAC) protocol (Release 6)," 3GPP TS 44.060 V6.9.0 (Sep. 2004).

Third Generation Partnership Project, "Technical Specification Group Services and System Aspects; Feasibility study on 3GPP system to Wireless Local Area Network (WLAN) interworking; (Release 6)," 3GPP TR 22.934 V6.2.0 (Sep. 2003).

Third Generation Partnership Project, "Technical Specification Group Services and System Aspects; 3GPP system to Wireless Local Area Network (WLAN) interworking; System description (Release 6)," 3GPP TS 23.234 V2.0.0 (Sep. 2003).

Third Generation Partnership Project, "Technical Specification Group Radio Access Network; Radio Resource Control (RRC); Protocol Specification (Release 4)," 3GPP TS 25.331 V4.11.0 (Sep. 2003).

Third Generation Partnership Project, "Technical Specification Group Radio Access Network; Radio Resource Control (RRC); Protocol Specification (Release 4)," 3GPP TS 25.331 V4.15.0 (Sep. 2004).

Third Generation Partnership Project, "Technical Specification Group Radio Access Network; Radio Resource Control (RRC); Protocol Specification (Release 5)," 3GPP TS 25.331 V5.6.0 (Sep. 2003).

Third Generation Partnership Project, "Technical Specification Group Radio Access Network; Radio Resource Control (RRC); Protocol Specification (Release 5)," 3GPP TS 25.331 V5.10.0 (Sep. 2004).

Third Generation Partnership Project, "Technical Specification Group Services and System Aspects; 3GPP system to Wireless Local Area Network (WLAN) interworking; System description (Release 6)," 3GPP TS 23.234 V6.2.0 (Sep. 2004).

Third Generation Partnership Project, "Technical Specification Group Radio Access Network; Radio Resource Control (RRC); Protocol Specification (Release 6)," 3GPP TS 25.331 V6.3.0 (Sep. 2004).

UMA Architecture (Stage 2) R1.0.4, May 2, 2005, Unlicensed Mobile Access (UMA); Architecture (Stage 2).

Zhang et al., "Integration of Wireless LAN and 3G Wireless—Efficianet Mobility Management for Vertical Handoff between WWAN and WLAN", 2003.

\* cited by examiner

METHOD AND SYSTEM FOR FACILITATING HANDOVER FROM A THIRD GENERATION (3G) CELLULAR COMMUNICATION SYSTEM TO A WIRELESS LOCAL AREA NETWORK (WLAN)

CROSS REFERENCE TO RELATED APPLICATION

This application claims the benefit of U.S. Provisional Application No. 60/519,761 filed Nov. 13, 2003, which is incorporated by reference as if fully set forth.

FIELD OF INVENTION

The present invention is related to a wireless communication system. More particularly, the present invention is related to a method and system for facilitating inter-system handover in a wireless communication system.

BACKGROUND

Prior art cellular-type wireless communication systems, such as universal mobile telecommunication services (UMTS) systems, comprise a plurality of cells having a particular coverage area. As a wireless transmit/receive unit (WTRU) moves across the boundary of the cells, the WTRU needs to handover from one cell to another.

Each cell broadcasts information necessary to facilitate the handover procedure within the UMTS system. This information typically includes a neighbor cell list comprising a list of neighbor cells in the vicinity of the serving cell. The neighbor cell list enables a WTRU to search through only a limited number of cells, instead of all possible codes. As a result, the WTRU is able to speed up the cell search procedure and execute handover to a new cell more quickly.

Meanwhile, wireless local area networks (WLANs) based on IEEE 802.11 standards have been developed, and are widely being deployed. These systems are desirable for their support of high data rate transmissions. One example of the deployment of a WLAN in accordance with 802.11 standards is the use of access points, so called "hot spots", in public spaces. A WTRU with an 802.11 interface may connect to a hot spot without any physical connections. Once the WTRU is wirelessly associated with the hot spot via RF interface, the WTRU is able to transmit and receive data through the hot spot typically at a much faster data rate than that provided in a UMTS system.

While a hot spot provides high quality, high data rate connectivity, the service range of the hot spot is typically limited to a relatively short range. Since the transmission power of a WTRU under the 802.11 standards is limited to a relatively low power level, it is difficult to achieve sufficient coverage throughout an area of large population. In addition, due to the limited range of 802.11 devices, WTRUs typically perform a constant search procedure for new hot spots. This is a severe processing load and, therefore, a constant drain on WTRUs batteries. In the absence of a mechanism for informing an existence of the hot spot, the WTRU should search signals transmitted from the hot spot periodically and continuously. This causes an unnecessary consumption of processing power and resources.

It would be desirable to provide a dual-mode WTRU which is configured to communicate in, and handover between, a UMTS system and a WLAN system under 802.11 standards, since a WTRU may receive much higher rate services from the hot spot while maintaining a connection in a wide coverage area in a UMTS system. However, currently, there is no convenient method for handover from a cellular-type communication system, such as UMTS, to a wireless local area network (WLAN)-type communication system, such as a hot spot. Therefore, it is desirable to provide a method and system for facilitating inter-system handover between two wireless communication systems, such as UMTS and WLAN.

SUMMARY

A method for facilitating inter-system handover by a multi-mode wireless transmit/receive unit (WTRU) is disclosed. The WTRU is capable of communicating in multiple wireless communication systems using different wireless communication protocols. A first wireless communication system provides a hot spot within at least a portion of the coverage area of a second wireless communication system. A base station in a cell in the second wireless communication system generates and transmits a message to inform the WTRU of the existence of the hot spot located in the vicinity of the cell. The WTRU receives the message and is therefore informed of the existence of the hot spot in the vicinity of the cell.

The WTRU is able to initiate a handover procedure more rapidly and efficiently without searching for a signal transmitted from the hot spot.

DETAILED DESCRIPTION OF THE PREFERRED EMBODIMENTS

Herein, the term "WTRU" includes, but is not limited to, a station, a mobile station, a user equipment, a fixed or mobile subscriber unit, a pager, or any other type of device capable of operating in a wireless environment.

The present invention facilitates an inter-system handover between two different wireless communication systems using two different communication protocols. The wireless communication systems may be any type of present of future-developed wireless communication systems including, but not limited to, UMTS, code division multiple access 2000 (CDMA2000), global system for mobile communications (GSM), general packet radio services (GPRS), IEEE 802.11 systems, and Bluetooth.

For simplicity, hereinafter the present invention will be described with reference to a UMTS system and a IEEE 802.11 WLAN communication system which provides a hot spot within the coverage area of the UMTS system. However, as aforementioned, it should be noted that the present invention also applies to any wireless access systems other than UMTS or 802.11 WLAN systems equally well.

Figure 1:
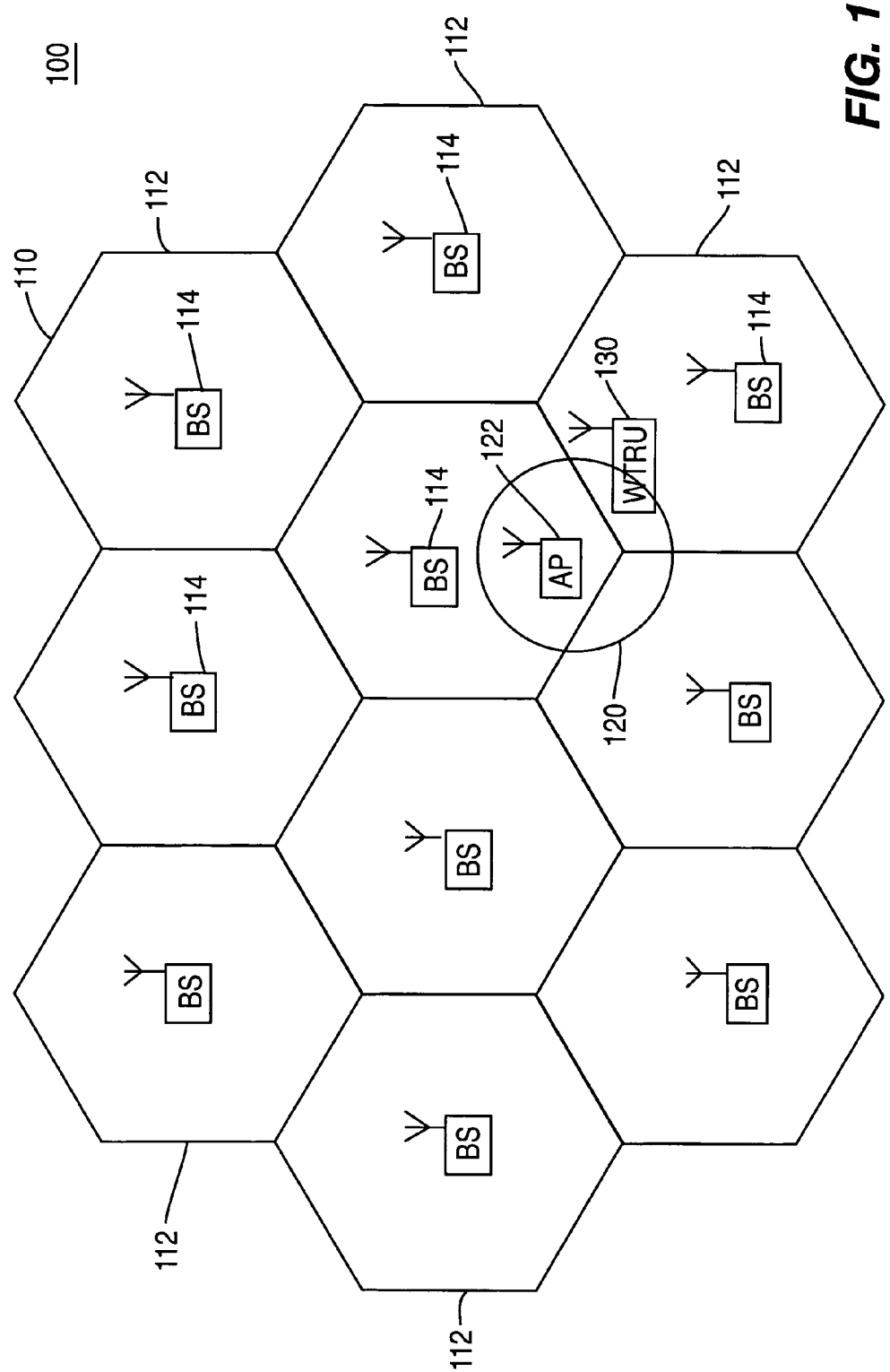
FIG. 1 is a block diagram of a wireless communication system in accordance with the present invention.

FIG. 1 is a block diagram of a wireless communication system 100 in accordance with the present invention. The system 100 comprises two or more communication systems operating in different communication protocols and having an overlapping coverage area. FIG. 1 illustrates, as an example, a UMTS system 110 and a hot spot 120 operating under an 802.11 standards. The UMTS system 110 has a wider coverage area and the hot spot 120 has a limited coverage area within the UMTS system 110 coverage area. The UMTS system 110 comprises a plurality of cells 112 each of which serves a particular coverage area. Each cell 112 is served by a base station 114, and the hot spot 120 is served by an AP 122.

A WTRU 130 is configured to communicate in both the UMTS system 110 and the hot spot 120. The WTRU 130 monitors messages, constantly or periodically, from a plurality of base stations 114 and APs 122. The WTRU 130 performs physical measurements on the messages received from the cells 112 and the hot spot 120, and may handover to another cell 112 or the hot spot 120.

In accordance with the present invention, each base station 114 of the UMTS system 110 informs the WTRU 130 of the existence of any hot spot, such as the hot spot 120, in the vicinity of the cell 112. The base station 114 of each cell is already aware of the existence of the hot spot 120 located in the vicinity of each cell 112. The manner in which the base station 114 obtains information regarding the hot spot 120 is not central to the present invention. However, by way of example, the base station 114 may obtain the information by detecting signals transmitted from the hot spot 120 or by receiving messages from the UMTS system 110 or the WLAN system. Alternatively, the base station 114 may be manually configured to include such information when the base station 114 is set-up, or as new hot spots are configured.

In the UMTS system 110, the base station 114 in each cell 112 generates and broadcasts a neighbor cell list to support efficient handover between cells 112 in the UMTS system 110. In accordance with the present invention, each cell 112 preferably also includes additional information regarding the hot spot 120 in the neighbor cell list. Alternatively, the cell 112 may transmit a separate message for this purpose.

The WTRU 130 receives the neighbor cell list, or a separate message, from the base station 114 of the cell 112 serving the WTRU 130, and is therefore informed of the existence of the hot spot 120 in the vicinity of the cell 112. The information about hot spot 120 includes, but is not limited to, the location of the hot spot 120, the frequency band, security level, or any other information necessary for establishing a connection to the hot spot 120. Since the WTRU 130 obtains the necessary information for connection to the hot spot 120 in advance, the WTRU 130 may reduce the processing power and any resources that are typically required to locate the hot spots and to set the parameters for connection to a particular hot spot.

The information about the hot spot 120 is preferably broadcast from the base station 114 to all WTRUs 130 in the cell 112. Alternatively, the base station 114 of each cell 112 may transmit the neighbor cell list, or a separate message, only to a subset of WTRUs 130 via a dedicated channel or a common/shared channel.

Figure 2:
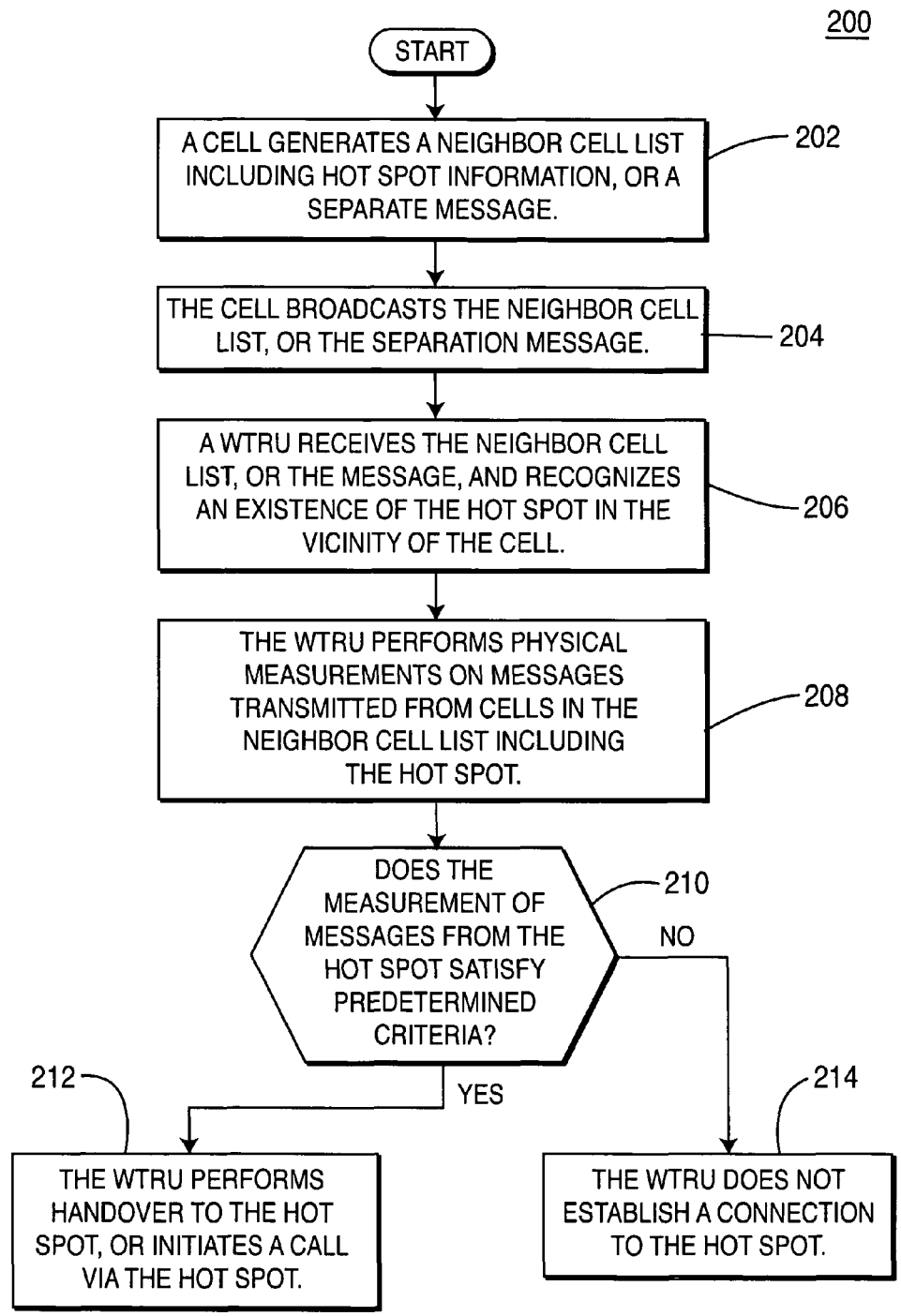
FIG. 2 is a flow diagram of a process for facilitating inter-system handover in accordance with the present invention.

FIG. 2 is a flow diagram of a process 200 for facilitating inter-system handover by informing a WTRU 130 of an existence of a hot spot 120 in accordance with the present invention. A WTRU 130 is a multi-mode WTRU so that the WTRU 130 may receive messages from both a UMTS system 110 and a WLAN system (i.e., hot spot) 120. A base station 114 in a cell 112 of the UMTS system 110 informs WTRUs 130 located in the cell 112 of the existence of the hot spot 120 in the vicinity of the cell 112. The information about the hot spot 120 is preferably included in a neighbor cell list. However, the information may be transmitted through a separate message.

Each base station 114 in the UMTS system generates a neighbor cell list for efficient handover to another cell (step 202). The neighbor cell list contains information necessary for handover including, but not limited to, a code group of neighbor cells, primary scrambling code identity, or a search window for neighbor cells. Each base station 114 broadcasts the neighbor cell list to WTRUs 130 via a broadcast channel.

Each base station 114 preferably includes information regarding the nearby hot spot 120 in the neighbor cell list, or generates a separate message (step 202), and transmits the neighbor cell list or the message to WTRUs 130 located in each cell 112 (step 204). The information about the hot spot may include, but is not limited to, the location of the hot spot, the frequency band, security level, or any other information necessary for establishing a connection to the hot spot.

The information regarding the hot spot 120 is preferably broadcast. However, a base station may transmit the information about the hot spot 120 to only a subset of WTRUs 130 instead of broadcasting it. The information may be transmitted via either a dedicated channel or a common/shared channel.

The WTRU 130 receives the neighbor cell list, or the separate message, and is therefore informed of the existence of the hot spot 120 (step 206). The WTRU 130 may initiate a handover procedure more rapidly and efficiently without searching for a signal transmitted from the hot spot 130.

The WTRU 130 may be in either an idle mode or an active mode when the WTRU 130 receives the neighbor cell list or the separate message. When the WTRU 130 is in an active mode, the WTRU 130 utilizes the information about the hot spot 120 for handover to the hot spot 120, and when the WTRU 130 is in an idle mode, the WTRU 130 may initiate a new call via the hot spot 120 using the information.

Before establishing a connection to the hot spot 120, the WTRU 130 performs physical measurements on messages transmitted from base stations 114 in the neighbor cell list and the hot spot 120 (step 208). The physical measurements may be any measurements relevant to measure and compare signal qualities among the neighbor cells 112 and the hot spot 120. This may include, but is not limited to, a signal-to-interference ratio (SIR) or a received signal strength indicator (RSSI).

The WTRU 130 determines whether the measurement of messages transmitted from the hot spot 120 satisfies predetermined criteria (step 210). If the measurements satisfy the criteria, the WTRU 130 initiates a handover procedure to the hot spot 120, or initiates a new call via the hot spot 120 (step 212). If the measurements do not satisfy the predetermined criteria, the WTRU 130 does not attempt to establish a connection to the hot spot 120 (step 214).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method implemented in a wireless transmit/receive unit (WTRU), the method comprising:

the WTRU receiving a network information message via a cellular network while the WTRU is in either active mode or idle mode,
wherein the network information message includes information related to a plurality of wireless access networks available for handoff, the information including a neighbor cell list that identifies the plurality of wireless access networks available for handoff,
wherein the plurality of wireless access networks includes a first wireless access network based on a first wireless access technology and a second wireless access network based on a second wireless access technology, wherein the first wireless access technology and the second wireless access technology are different, and wherein the plurality of wireless access networks consists of wireless access networks in the vicinity of the WTRU;

on a condition that the WTRU is in active mode, the WTRU performing physical measurements only on signals transmitted from the wireless access networks identified in the neighbor cell list, in response to receiving the neighbor cell list;

the WTRU selecting one of the networks from the plurality of wireless access networks for handover; and the WTRU initiating a handover procedure with the selected network; and on a condition that the WTRU is in idle mode, the WTRU selecting one of the wireless access networks identified in the neighbor cell list using the received information related to the wireless access network and initiating a new call to the selected wireless access network.

2. The method of claim 1, wherein the selected network is a wireless local area network (WLAN).

3. The method of claim 1, wherein the selected network is a WiMax network.

4. The method of claim 1, wherein the selected network is a wireless personal area network (WPAN).

5. The method of claim 1 wherein the network information message includes location information related to the networks in the plurality of wireless access networks.

6. The method of claim 1 wherein the network information message includes communication parameters related to the networks in the plurality of wireless access networks.

7. The method of claim 6 wherein the communication parameters include frequency information.

8. The method of claim 1 wherein the selecting one of the networks from the plurality of wireless access networks for handover is based on the measured signal strength of at least one network from the plurality of wireless access networks.

9. The method of claim 1 wherein the selecting one of the networks from the plurality of wireless access networks for handover is based on information included in the network information message.

10. The method of claim 1, wherein the first wireless access technology is a cellular technology, and wherein the second wireless access technology is a wireless local area network (WLAN) technology.

11. A wireless transmit/receive unit (WTRU) comprising:

a processor, for receiving a network information message via a cellular network while the WTRU is in either active mode or idle mode, wherein the network information message includes information related to a plurality of wireless access networks available for handoff, the information including a neighbor cell list that identifies the plurality of wireless access networks available for handoff, wherein the plurality of wireless access networks includes a first wireless access network based on a first wireless access technology and a second wireless access network based on a second wireless access technology, wherein the first wireless access technology and the second wireless access technology are different, and wherein the plurality of wireless access networks consists of wireless access networks in the vicinity of the WTRU; and a receiver, on a condition that the WTRU is in active mode, performs physical measurements only on signals transmitted from the wireless access networks identified in the neighbor cell list, in response to receiving the neighbor cell list;

wherein the processor selects one of the networks from the plurality of wireless access networks for handover and to initiate a handover procedure with the selected network and wherein on a condition that the WTRU is in idle mode the processor selects one of the wireless access networks identified in the neighbor cell list using the received information related to the wireless access network and to initiate a new call to the selected wireless access network.

12. The WTRU of claim 11, wherein the selected network is a wireless local area network (WLAN).

13. The WTRU of claim 11, wherein the selected network is a WiMax network.

14. The WTRU of claim 11, wherein the selected network is a wireless personal area network (WPAN).

15. The WTRU of claim 11 wherein the network information message includes location information related to the networks in the plurality of wireless access networks.

16. The WTRU of claim 11 wherein the network information message includes communication parameters related to the networks in the plurality of wireless access networks.

17. The WTRU of claim 16 wherein the communication parameters include frequency information.

18. The WTRU of claim 11 wherein the processor is configured to select one of the networks from the plurality of access wireless networks for handover based on the measured signal strength of at least one network from the plurality of wireless access networks.

19. The WTRU of claim 11 wherein the selecting one of the networks from the plurality of wireless access networks for handover is based on information included in the network information message.

20. The WTRU of claim 11, wherein the first wireless access technology is a cellular technology, and wherein the second wireless access technology is a wireless local area network (WLAN) technology.

* * * * *

UNITED STATES PATENT AND TRADEMARK OFFICE
CERTIFICATE OF CORRECTION

| | | |
|---|---|---|
| PATENT NO. | : 8,548,478 B2 | Page 1 of 1 |
| APPLICATION NO. | : 10/986717 | |
| DATED | : October 1, 2013 | |
| INVENTOR(S) | : Fatih M. Ozluturk | |

It is certified that error appears in the above-identified patent and that said Letters Patent is hereby corrected as shown below:

ON THE TITLE PAGE

Item (75), line 1, change "Faith" to --Fatih--.

IN THE CLAIMS

In claim 11, at column 6, line 15, after the word "and", delete "to initiate" and insert therefore --initiates--.

In claim 11, at column 6, line 21, after the word "and", delete "to initiate" and insert therefore --initiates--.

Signed and Sealed this
Tenth Day of June, 2014

Michelle K. Lee
*Deputy Director of the United States Patent and Trademark Office*